No. 707,230. Patented Aug. 19, 1902.
J. C. HENRY, Dec'd.
S. A. HENRY, Executrix.
AUTOMOBILE.
(Application filed Apr. 1, 1901.)
(No Model.)

Diagrams

WITNESSES:
INVENTOR.
John C. Henry

UNITED STATES PATENT OFFICE.

JOHN C. HENRY, OF DENVER, COLORADO; SUSIE A. HENRY, EXECUTRIX OF SAID JOHN C. HENRY, DECEASED, ASSIGNOR TO STANLEY ELECTRIC MANUFACTURING COMPANY, A CORPORATION OF NEW JERSEY.

AUTOMOBILE.

SPECIFICATION forming part of Letters Patent No. 707,230, dated August 19, 1902.

Application filed April 1, 1901. Serial No. 53,998. (No model.)

*To all whom it may concern:*

Be it known that I, JOHN C. HENRY, a citizen of the United States, residing in the city of Denver, county of Arapahoe, and State of Colorado, have invented certain new and useful Improvements in Automobiles, of which the following is a specification.

The invention relates to automatic vehicles, and is of the mixed or combination class, having various forms of power to operate it.

The invention will be described in an application where both electric and steam power are used to propel the vehicle.

The invention is intended to supply a want felt in vehicles, so as to increase their range of work.

For ordinary purposes, such as city work, an electric automobile is the most suitable, as it can readily be run by children or ladies who have but little knowledge of machinery, and it emits no vapor, which is objectionable in congested districts. The steam or gas motor has the advantage that it need not depend on fixed stations for its supply of energy, gasolene, which is usually the material used for combustion in the various kinds of vehicles, being obtainable in any community.

The purpose of the invention is to provide a vehicle which may be run with an electric motor or steam power, or by both, and where the steam-engine may be used to drive the motor as a generator for the purpose of charging the battery thereon.

Figure 1:
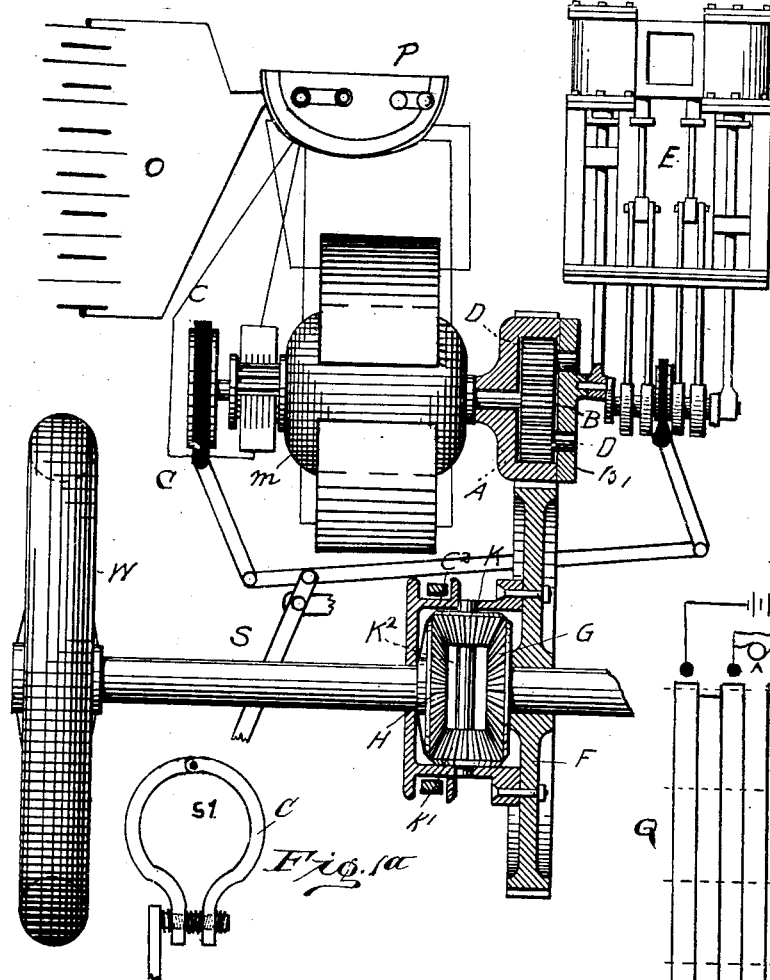
Figure 5:
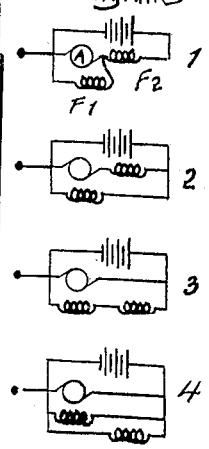
Figure 4:
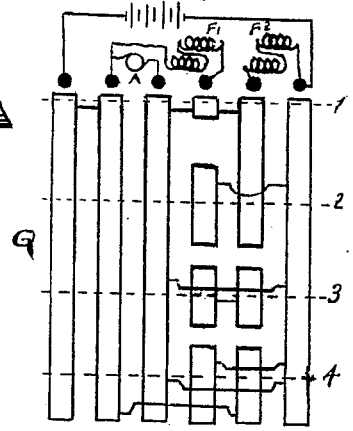
Figure 2:
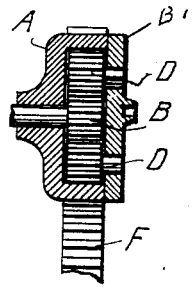
Figure 3:
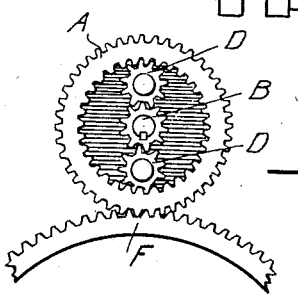

In the drawings, Figure 1 represents a plan of the combined mechanism necessary for the purpose. Fig. 1$^a$ is a side elevation of a brake-clutch for arresting one of the motors. Fig. 2 is a section, and Fig. 3 an elevation, of the transmitting-gear. Fig. 4 is a development of the controller, and Fig. 5 shows diagramatically the several circuit conditions established by the controller.

W represents the driven wheel of an automobile, S a divided axle, and G an epicyclic or planetary gear, which may be of any well-known differential pattern which would permit the wheels to be driven independently of each other.

F represents a spur-gear loosely mounted on the divided axle, it being connected to the housing $C^2$, within which the pinions K and K' have bearings, and they are secured to the shaft $K^2$. Ordinarily these pinions do not turn on their own axes, but revolve in a planetary manner with the spur-gear F. When, however, the driven wheels run unequally, as when the vehicle is turning a curve, for instance, the pinions turn on their own axes as well as planetary, thus compensating for variations in the travel of the separate driven wheels.

E represents a steam-engine. M represents the armature of an electric motor, while A represents the intermediate mechanism, which is shown in section, it being a planetary or differential form of gearing used to couple the engine and motor with the vehicle. This gearing is shown partially in section in Fig. 2 and in sectional elevation in Fig. 3. In Fig. 1, C, C', and $C^2$ represent friction-wheels, for which manually-operated clutches or friction-clutches are provided, like that shown in Fig. 1$^a$. It will be understood that these members and their connecting mechanism may be held fast or loosened by clutches. I will describe the operation as if the machines were of the standard kind—*i. e.*, an automobile revolving at one thousand revolutions per minute or a steam-engine designed to run at a speed of two hundred and fifty strokes per minute.

Suppose we wish to drive the vehicle by the electric motor. The steam-engine is held by the clutch C'. This holds the member B' stationary. It will be noticed in Figs. 1 and 2 that the pinions D have bearings and revolve on pins which are secured to the member B' referred to, so that when the engine is held the pinions are permitted to turn on their own axes only. The intermediate pinion B is keyed fast to the armature-shaft. Thus by holding the engine the armature in revolving turns the pinions on their own axes and revolves the combined internal and external gear, which they engage, but at a reduced speed. The internal gear has teeth cut on its periphery which engage with the teeth of the spur-gear F, mounted on the vehicle-axle and driving the vehicle-wheels at a speed reduction of ten to one, which about agrees with a favorable vehicle practice. When it is desired to drive the vehicle from the engine alone, the armature is held by clutch C and the circuit opened. The engine E then drives the member B and carries the pinions D around in a planetary manner. They by abutting against the stationary pinion (central) carry the internal gear around with them. This in turn drives the axle-gear at a speed of about one hundred revolutions per minute or at the same speed as the motor drives it. If the clutches C and C' are loose, the engines and motors are both free to run. Should they, however, run at a predetermined speed—that is, the engine at two hundred and fifty strokes and the armature at one thousand revolutions—the pinions B and D will revolve, only the latter traveling around within the internal gear. There will be no tendency to drive it. If, however, the speed relation between the engine and the motor is varied, as by decreasing or increasing the speed of either the motor or engine separately or as by decreasing the speed of one of the power-transmitting machines and increasing the speed of the other, they both tend to drive the vehicle at a slow speed, but with a differential movement—that is, with leverage and great torque. The speed of the vehicle may be further increased by changing the difference of speed between the motor and engine. The direction of the vehicle also depends upon the relative speed of the motor-engine, so that when running with the differential movement both the speed and the direction may be controlled by independently varying the speed of the power members. On descending grades or when coming to a stop the engine is held and the vehicle allowed to drive the motor as a generator and to store up its energy of momentum or gravity into the battery. To accomplish this, I arrange to gradually maintain a constant potential on the battery as the vehicle speed decreases. This I accomplish by a novel method of varying the field resistance, as shown in the diagram. To further illustrate, with motor running at a speed of a thousand per minute and the engine at two hundred and fifty the vehicle is stationary. With the motor running at twelve hundred per minute and the engine at two hundred and fifty the vehicle's speed will be due to the difference, which, say, corresponds to two miles per hour. By making a still greater change the vehicle's speed is correspondingly increased and the leverage decreased. It will be understood that the engine's speed and that of the motor are regulated independently. It will be also understood that the vehicle is of the electric-automobile class and one which derives its current from a battery thereon. The motor is of the shunt-wound or independently-excited kind which is free to act as a generator or motor.

The battery is represented by O, and the motor-controller at P Q. Fig. 4 represents a development of the controller, and diagrams 1 to 4, Fig. 5, inclusive, show the course of the current in the different positions. It will readily be seen that the speed of the motor and its voltage as a generator may be changed so as to retard the vehicle.

S' represents an operating-screw for the clutch C.

S represents a lever adapted to hold either one of the clutches or to release both of them, as the work may require.

To charge the storage battery, clutch $C^2$ is tightened and the vehicle-wheels held stationary. The steam-engine is then started and made to drive the motor as a generator, the current generated being absorbed by the battery. The motor may be regulated in any well-known regenerative manner, the point being to insure its working as a dynamo and charging the battery when the vehicle is descending a grade or being stopped. The clutch $C^2$ may be dispensed with and the vehicle held by other well-known means.

The combination may be used on railways where steam is objectionable in the congested districts, but permissible in the suburbs.

Having thus described my invention, the following is what I claim as new therein and desire to secure by Letters Patent:

1. In combination with an electric motor and a pressure-operated motor, a planetary gear intermediate and connected to said motors, and to a device to be driven, and clutch devices arranged so that any one of said motors may be held stationary for the purpose set forth.

2. In a motor-vehicle, the combination of a planetary gear connected to drive the vehicle, a fluid-pressure motor and an electric motor connected respectively to different parts of said gear all arranged so that either of said motors may drive the vehicle independently.

3. In a motor-vehicle, the combination of a planetary gear connected to drive the vehicle, a fluid-pressure motor and an electric motor connected respectively to different parts of said gear, and clutching means for arresting either of said gear parts all arranged so that either or both of said motors may drive the vehicle.

4. The combination of an electric motor and an engine, a planetary gear connecting said parts to one another and to a device to be driven, means for clutching either one of these parts so as to arrest either of the motors or the driven part, and a storage battery connected to the motor so as to be charged by the same as a dynamo, when the driven part is arrested.

5. In a motor-vehicle, the combination of a planetary gear connected to drive the vehicle, an electric motor, and a pressure-engine connected with different parts of said gear, clutches adapted to arrest either of said gear parts, means for arresting the motion of the vehicle, and a storage battery connected with the electric motor, whereby the vehicle may be driven from either or both of said motors, or on arresting the vehicle, the pressure-engine may be caused to drive the electric motor as a dynamo to charge the battery.

6. In a motor-vehicle, an engine and a motor, a planetary gear having a central pinion keyed to the armature-shaft of the motor, the planetary pinions and a part carrying same and connected to the engine, an internal gear, engaging said planetary, gear to which the vehicle-driving mechanism is connected, and clutches arranged to arrest the movement of the central pinion, planetary gear or the driving-gear of the vehicle.

In testimony whereof I have hereunto set my hand and seal, this 6th day of March, 1901, in the presence of two witnesses.

JNO. C. HENRY. [L. S.]

Witnesses:
 CARLE WHITEHEAD,
 H. DUDLEY TUPPER.